Patented Aug. 5, 1952

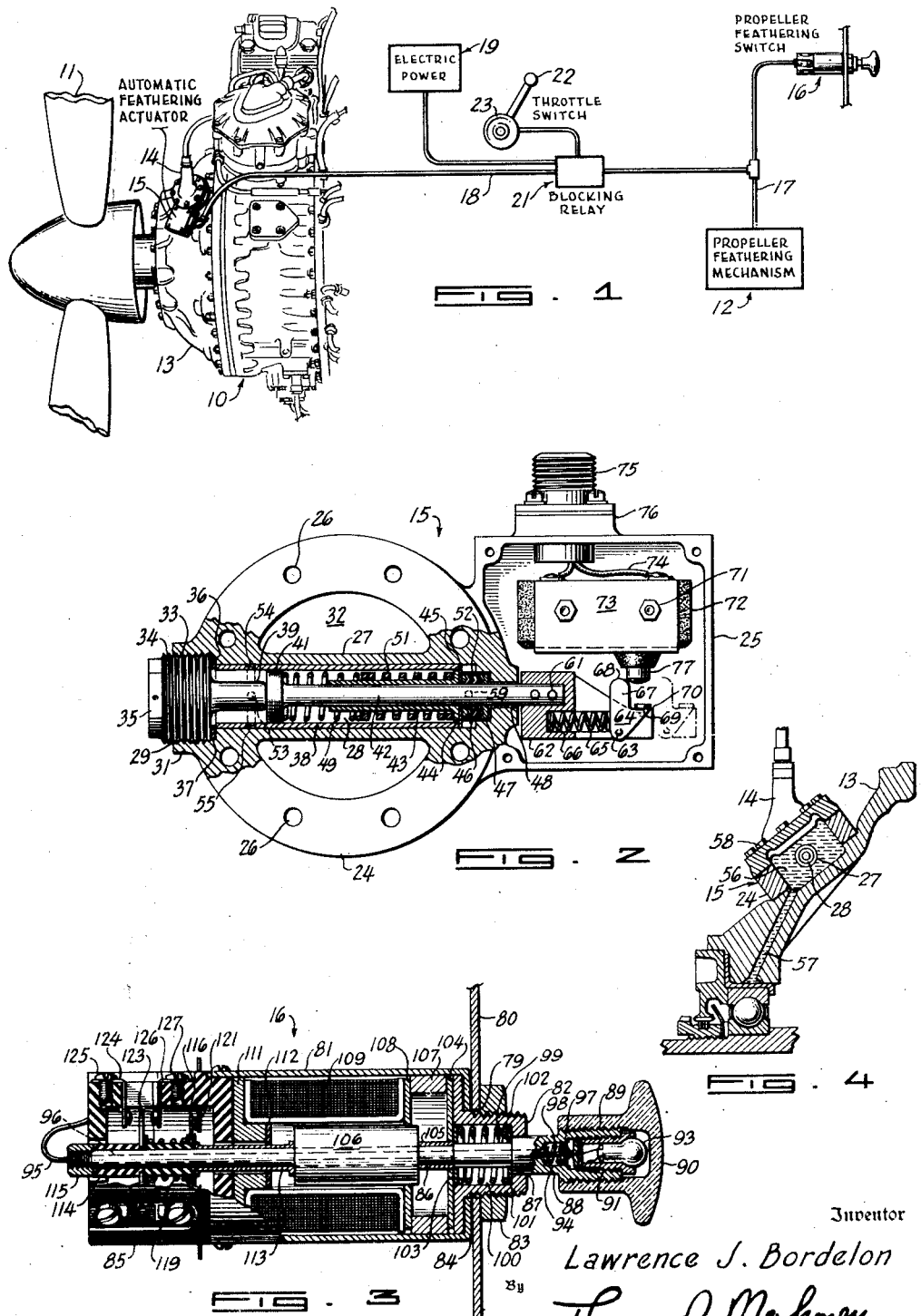

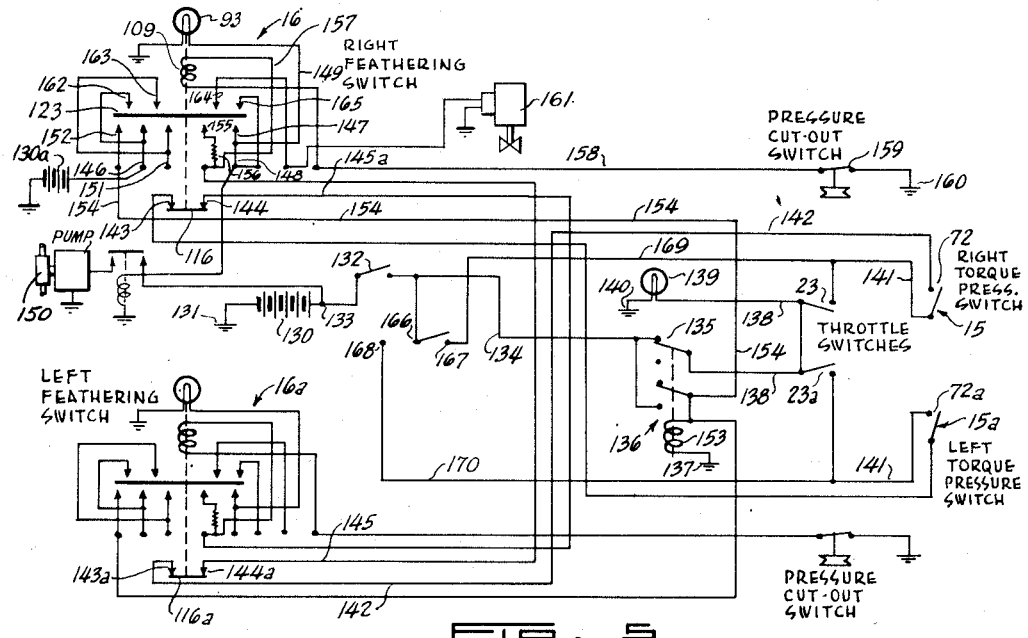
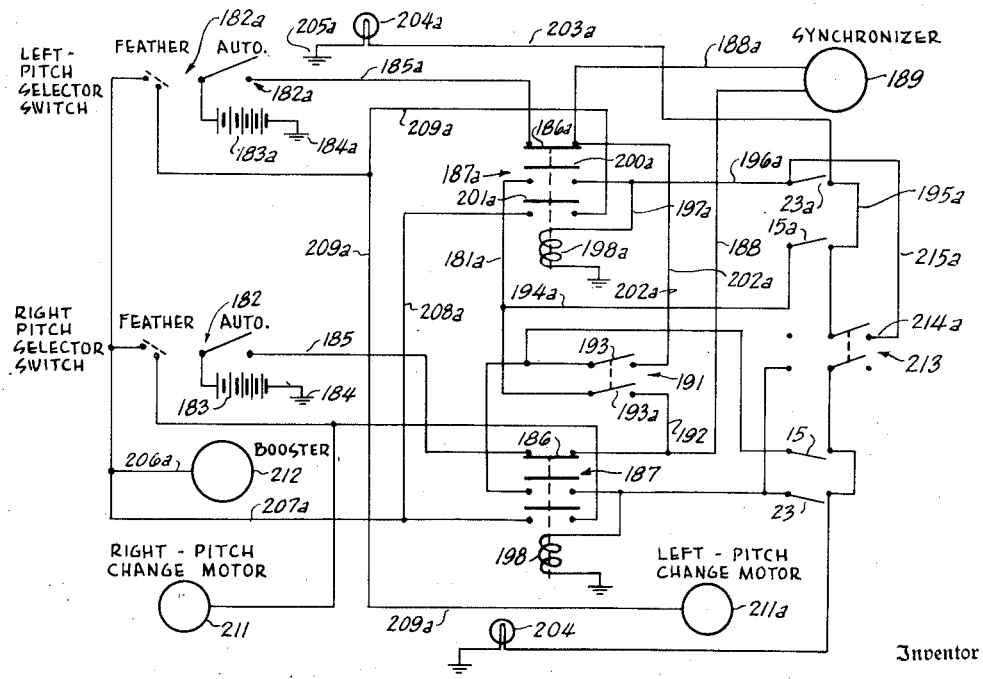

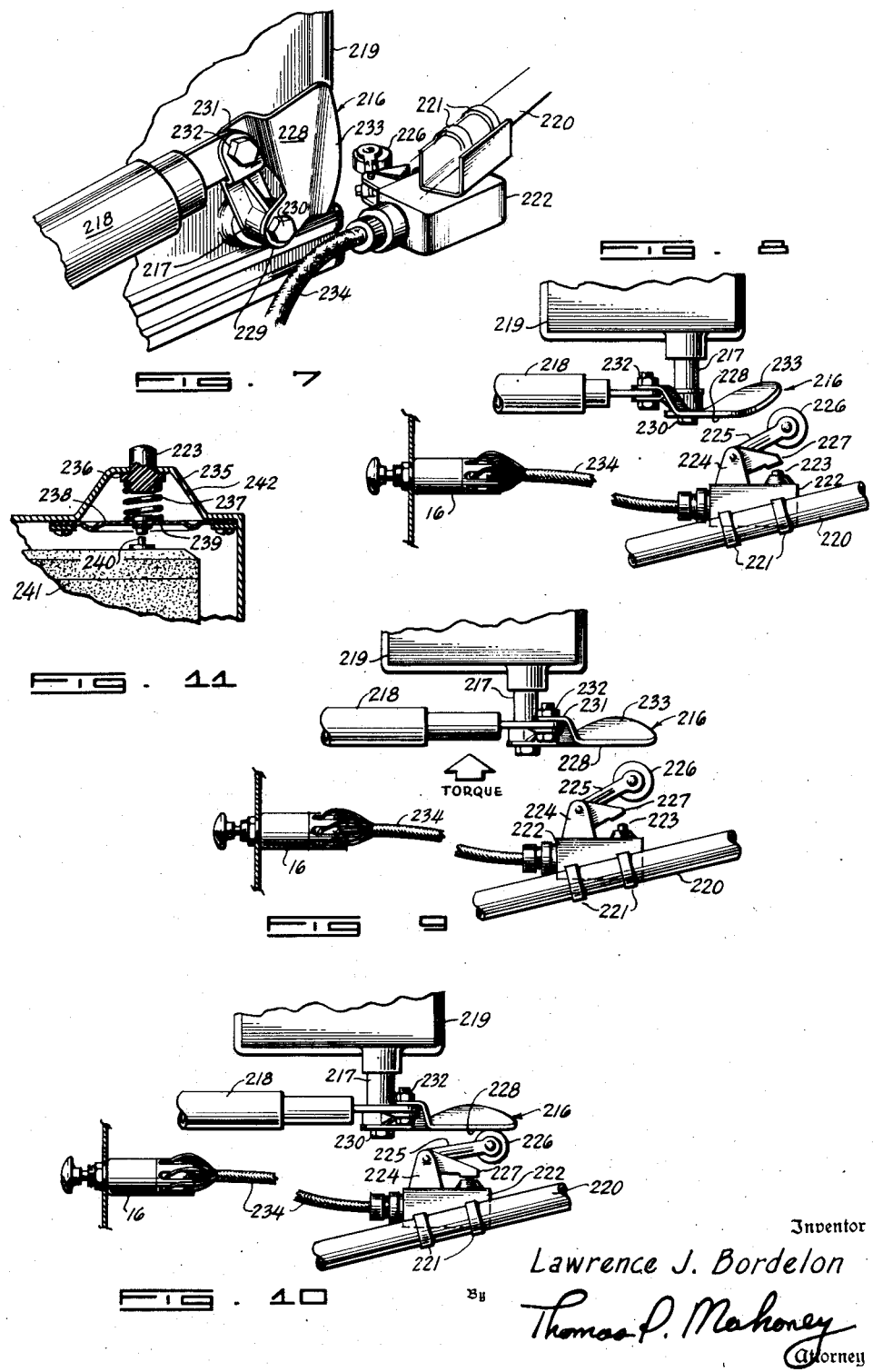

2,605,849

UNITED STATES PATENT OFFICE 2,605,849

AUTOMATIC PROPELLER FEATHERING SYSTEM

Lawrence J. Bordelon, San Diego, Calif., assignor to Consolidated Vultee Aircraft Corporation, San Diego, Calif., a corporation of Delaware Application October 9, 1947, Serial No. 778,933

21 Claims. (Cl. 170—135.29)

This invention relates to improvements in propeller feathering systems and more particularly to a system adapted to automatically feather the propeller associated with an aircraft engine when said engine fails despite the application of power at the throttle.

In conventionally equipped multi-engine aircraft the engines have associated therewith propellers embodying therein means adapted not only to vary the pitch of the propeller but also to permit the propeller to be fully feathered. The provision for fully feathering the propeller is incorporated to reduce the drag induced by a windmilling propeller when the engine with which the propeller is associated fails. The provision for feathering the propeller when the engine fails is necessary because the induced drag occasioned by a windmilling propeller may be so great as to hamper or seriously limit the performance of the aircraft when such engine failure is encountered. This is particularly true in the case of two-engined aircraft since, when one engine fails, the load upon the remaining engine is so great that the complicating of this critical situation by induced drag from an unfeathered propeller cannot be tolerated.

Such engine failure is particularly dangerous when the aircraft is taking off because it is then that the maintenance of the full power output of the aircraft is critical. When the engine fails it is necessary that the pilot ascertain which engine has failed and, having ascertained it, feather the propeller. Since time is of the essence the pilot must act quickly so that the non-functioning propeller will be feathered before the drag effect takes place.

In such circumstances it is conceivable that a pilot may not correctly ascertain the non-functioning engine and may push the feathering button associated with the wrong engine. If such a mistake occurs the aircraft will lose headway and an accident will result. The loss of an engine usually occurs under circumstances which are not conducive to unfailing accuracy on the part of the pilot, such as take-off in the rain. Frequently, also, the pilot may push the correct feathering button but the elapsed time between the actual failure of the engine and the discernment of that failure may be so great as to render the feathering of the propeller ineffective since the drag on the inactive propeller has already placed the aircraft in a dangerous situation.

As aerodynamic design has progressed there has been a tendency towards higher wing loading in transport aircraft and the problem of the induced propeller drag caused by the loss of an engine in such situations has received considerable attention. Regulations governing the loading of transport aircraft have been drawn which tend to penalize the operator of aircraft having high wing loadings since regulatory bodies have determined that the danger inherent in the loss of an engine in such aircraft in certain specific situations is proportional to the wing loading. Thus the operator must limit the amount of cargo or the number of passengers to an extent which renders the operation of such aircraft uneconomic.

However, the entire problem of the propeller windmilling drag occasioned by the loss of an engine in an aircraft having high wing loadings has been solved by the present invention which is designed to detect the loss of engine power, to signal such loss to the pilot and to automatically feather the propeller associated with the inoperative engine before the propeller drag affects the operation of the aircraft. The incorporation of the present invention in an aircraft will prevent the pilot from feathering a propeller associated with a properly functioning engine and will also immediately acquaint him with the fact that an engine has failed and will indicate which engine it is. Because there is no chance that the functioning engine will be affected by the propeller drag of the inoperative engine it is possible to safely increase the load limits of aircraft which incorporate devices manufactured in accordance with the present invention.

Broadly speaking, the invention consists in torque responsive means associated with the conventional propeller feathering system in such a manner that the loss of torque occasioned by failure of the engine will be transmitted to the torque responsive means, will cause the propeller to feather automatically and without the intervention of the pilot, and will indicate the fact of such engine failure and propeller feathering to the pilot by the incorporation of signal lights in the cockpit.

Of course, the wide variety of engine installations precludes the construction of an embodiment of the invention which will adequately and effectively handle all types of specific engine installations and, as a result, several systems for accomplishing the automatic feathering of the propeller have been designed.

For instance, hydraulically controlled propellers such as the Hamilton Standard, which are associated with power plants having integral torque nose installations, utilize a system consisting, basically, of torque responsive means associated with the torque nose of the engine and especially designed propeller feathering switch means mounted in the cockpit adapted both to automatically feather the propeller and indicate such feathering process to the pilot.

Power plants of a similar nature associated with electrically actuated propellers utilize an identical torque responsive device but instead of the especially designed feathering switch utilized with hydraulically actuated propellers the regular propeller control circuits incorporating feathering relays are utilized.

On engines which do not have torque noses a torque responsive means utilized in conjunction with the carburetor throttle arm is installed. This assembly is employed in conjunction with the especially designed propeller feathering switch if the propeller is hydraulically controlled or with the modified electrical circuits of an electrically controlled propeller if such a propeller is installed.

It is, therefore, an object of the present invention to provide an automatic propeller feathering system which is adapted to be employed in conjunction with the torque transmitting installation on an aircraft engine and to automatically feather the propeller through the intermediary of the propeller feathering mechanism when actuated by torque responsive means incorporated in the system.

Another object of the invention is the provision of an automatic propeller feathering system which has incorporated therein signal means designed to indicate when the propeller is being automatically feathered.

A further object of the invention is the provision of an automatic propeller feathering system having override means incorporated therein adapted to permit the pilot to stop the feathering of the propeller if he so desires.

An additional object of the invention is the provision of an automatic propeller feathering system which has incorporated therein means adapted to prevent the simultaneous automatic feathering of two propellers.

Another object of the invention is the provision of an automatic propeller feathering system which is so constituted that it automatically cuts off the automatic feathering circuits of associated propellers when one propeller has been feathered.

An additional object of the invention is the provision of an automatic propeller feathering system which is essentially simple to install and maintain and can be easily and economically manufactured.

Other objects and advantages of the invention will be made apparent by a consultation of the appended specification and the accompanying drawings, in which:

Figure 1 is a schematic view showing the broad details of one embodiment of the present invention;

Figure 2 is a vertical elevational view, partially sectioned, showing the pressure switch or torque pressure responsive means which is utilized in one embodiment of the present invention;

Figure 3 is a vertical sectional view of the feathering switch which is utilized in conjunction with the torque pressure switch;

Figure 4 is a vertical sectional view of a segment of the engine nose casing showing a portion of the hydraulic torque indicating system and the manner in which the pressure switch is mounted on the engine nose casing;

Figure 5 is a circuit diagram of the electrical system utilized in conjunction with a hydraulically actuated propeller;

Figure 6 is a circuit diagram of the electrical system utilized in conjunction with an electrically actuated propeller;

Figure 7 is a side elevational view of an alternative embodiment of the torque pressure responsive means as utilized in conjunction with an engine which does not have a torque nose incorporated therein;

Figure 8 shows the embodiment illustrated in Figure 7 in the position it assumes when the throttle of the engine is fully retarded and the engine is inoperative;

Figure 9 shows the same embodiment with the throttle advanced and the engine operative;

Figure 10 shows the same embodiment with the throttle advanced and the engine inoperative; and Figure 11 shows the time lag means incorporated in the torque responsive means shown in Figure 7.

There is shown in the drawings, Figure 1, an aircraft engine 10 having associated therewith a variable pitch propeller 11 which is adapted to be controlled by a propeller feathering mechanism 12. Incorporated in the engine 10 is a nose casing 13 which embodies torque indicating means 14 such as a magnesyn transmitter, which is mounted over an orifice in the nose casing.

A torque responsive device or pressure switch 15, which is one element of the automatic propeller feathering system as utilized in conjunction with engines embodying integral torque noses, is mounted on the nose casing 13 and interposed between the nose casing 13 and the magnesyn transmitter 14. Variations in torque pressure transmitted through the nose casing 13 will effect the actuation of the pressure switch 15 in a manner to be described in greater detail below.

A propeller feathering switch 16 is mounted upon the instrument panel within the cockpit of the aircraft and is connected both to the propeller feathering mechanism 12 as by means of leads 17, and to the pressure responsive device or switch 15 as by means of leads 18. The electric power which serves to actuate both the voluntary and automatic feathering of the propeller 11 is provided from a battery or similar power source 19 and flows thence into a blocking relay 21. The blocking relay 21 is provided to prevent the subsequent automatic actuation of another propeller in an aircraft after one propeller has been feathered even though a plurality of engines should fail. The mode of operation of the relay 21 will be described in greater detail below when the entire electric circuit in which it is incorporated is analyzed.

Mounted on the throttle quadrant in a position to be closed when throttles 22 are advanced are throttle switches 23 which prevent current from flowing from power source 19 into the blocking relay 21 until the throttles are advanced beyond a predetermined point. When the throttle is retarded and the engine becomes inoperative or power output falls below a predetermined level the automatic propeller feathering system cannot function as it would if the throttle were advanced since the throttle switch 23 is opened by the retardation of the throttle 22 and the current cannot flow into the circuit.

The pressure switch 15 (Figure 2) comprises a housing which may be cast or otherwise formed out of light-weight metal, which comprises two basic portions, a substantially circular mounting flange or means 24 and a substantially rectangular switch box 25 which is formed at one side of mounting flange 24. Holes 26 are drilled or otherwise created in the flange 24 to permit the mounting of the pressure switch upon the nose casing 13 of engine 10 under magnesyn transmitter 14.

A cylinder 27 formed integrally with mounting flange 24 passes transversely across a circular well 32 created in the interior of the mounting flange 24 and has a cylindrical bore 28 formed therein. The cylindrical bore 28 communicates with an opening 29 formed in the exterior of that side of the mounting flange 24 which lies opposite switch box 25. The mouth of opening 29 is surrounded by a cylindrical boss 31 formed integrally with the side of flange 24 and is threaded as at 33 to receive a threaded cylindrical plug 34 having a hexagonal or similarly formed head 35 which is adapted to facilitate the removal or insertion of the plug from or in the opening 29. The opening 29 is counterbored and of larger diameter than cylindrical bore 28 and a seat 36 is formed at its bottom which is adapted to receive a gasket 37 upon which the base of plug 34 is adapted to rest to prevent leakage of fluid past plug 34. Gasket 37 also serves to retain a linear or sleeve 38 which is slidably fitted within the interior of the cylindrical bore 28 and which serves to prevent excess wear of the walls of cylindrical bore 28.

Depending from the base of plug 34, integrally formed therewith and projecting into the interior of cylindrical bore 28 is a stop or movement limiting element 39 which is adapted to prevent the overtravel of a piston head 41 slidably maintained within the confines of sleeve 38 and adapted to move therein. A piston rod 42 is formed integrally with piston head 41 and has its opposite end projecting outwardly into the confines of switch box 25. Piston head 41, as will be described below, is responsive to variations in the torque pressure transmitted through the nose casing and, as such, constitutes means responsive to fluctuations in the torque pressure. A tubular sleeve or spring guide 43 is mounted about the piston rod 42 which is adapted to slide therethrough. The top of spring guide 43 also serves to limit the movement of piston head 41 as it moves under the pressure of engine oil, thus preventing overtravel of the head. Spring guide 43 has an enlarged circular base 44 which rests upon a washer 45 formed of steel or similar material, which in turn rests upon a seal box 46 mounted in a constricted portion 47 of cylinder bore 28. Formed integrally with seal box 46 and depending therefrom is a bushing 48 which serves to maintain the piston rod 42 against lateral deflection and prevents its abrading the surrounding material as it passes from circular mounting flange 24 into switch box 25.

Positioned about the piston rod 42 and having one end thereof biased against the underside of piston head 41 is a spring 49 which is of comparatively light construction and which is adapted to move the piston head 41 into contact with stop 39. The other end of spring 49 is seated upon one end of a more massive spring 51 which is considerably heavier in construction than light spring 49 and has its other end seated upon the circular flange 44 of spring guide 43. Before heavy spring 51 can be compressed the movement of the piston head 41 must compress light spring 49 upon its seat on heavy spring 51 in a manner and for a purpose which will be described when the operation of the pressure switch 15 is outlined below.

Housed within seal box 46 and adapted to be retained therein by washer 45 which closes the top of seal box 46 is a group of chevron or similar seals 52 which is designed to prevent fluid from running along piston rod 42 into the interior of switch box 25. Fluid, that is, engine oil, enters the cylindrical bore 28 of cylinder 27 through an orifice or hole 53 formed in the underside of cylinder 27. An annular groove 54 is formed in the periphery of sleeve 38. A plurality of holes 55 is formed in the sides of sleeve 38 in the region of groove 54 permitting the oil which flows through the hole 53 in cylinder 27 to flow around groove 54 into hole 55, into the interior of cylindrical bore 28, and impinge on piston head 41.

There is shown in Figure 4 a sectional detail of the engine nose casing 13 which clearly shows the manner in which cylinder 27 is immersed in the engine oil 56 within the circular mounting flange 24. The engine oil flows upwardly through the nose casing 13 through the medium of a channel 57. The magnesyn transmitter 14 is mounted above pressure switch 15 on the mounting flange 24 and both units are retained upon the nose casing 13 through the medium of bolts or similar fasteners 58. The oil which flows through channel 57 is under pressure and the pressure is in direct ratio to the torque output of the engine. The reduction gear of the engine has embodied therein a ring gear (not shown) which is positioned in the nose casing. When power is developed by the engine the torque output of the engine is transmitted to the ring gear whose displacement, in turn, is transformed into pressure upon the engine oil which is brought into contact with magnesyn transmitter 14. As can be seen from the drawing this pressurized oil is fed into the cylinder of pressure switch 15 and it is thus that the piston head 41 is displaced within cylinder bore 28 when the engine develops power. This process will be described in greater detail below.

When oil under pressure is fed into cylinder bore 28 there is a possibility that a certain amount will leak past piston head 41. To prevent this oil from collecting in cylindrical bore 28 on the wrong side of piston head 41 there is provided a bleed or draining hole 59 which is formed in the circular flange 24 below washer 45 contiguous to seal box 46. Hole 59 is juxtaposed to a hole (not shown) in nose casing 13 which permits the oil to flow back into the engine crankcase. Thus the possibility that sufficient oil could accumulate in cylindrical bore 28 of cylinder 27 to hamper the movement of piston head 41 or be forced past chevron seals 52 into switch box 25 is obviated. Since the by-passed oil must reach the bleed hole 59 to be scavenged therethrough the washer 45 is provided with a hole or plurality of holes (not shown) to permit the passage of the oil thereby.

Securely mounted as by means of pins 61, or similar fasteners, upon that end of piston rod 42 which projects into the interior of switch box 25 is a block or carriage 62 which is adapted to be longitudinally displaced within switch box 25 by the movement of piston rod 42. Pivotally mounted on the forward end of carriage 62 as by means of a pin 63 is a trigger 64. Trigger 64 is biased into an upright position through the medium of a spring 65 which is housed within a cylindrical hole 66 formed in block 62 parallel to its longitudinal axis. One end of spring 65 is heated on the end of hole 66 and the other rests against the base of trigger 64. Trigger 64 has an upright, vertical switch actuating arm 67 having a radiused top portion 68 adapted to actuate a switch, as will be described below. Below the arm 67 and projecting outwardly at a right angle therefrom is a stop portion 69 which is adapted to cooperate with the top 70 of carriage 62 at the forward end thereof to prevent the forward declination of vertical arm 67 of trigger 64 for a purpose to be described below.

Secured within the confines of switch box 25 by means of nuts and bolts 71 fastened through the wall of the box is a micro-switch 72 having normally open contacts. It is, of course, obvious that another type of switch could be used and it is not intended that the invention be limited to the use of this type of switch. A shield 73 prevents the cover of the micro-switch 72 from being dislodged from the body. Leads 74 run from the switch 73 into a plug 75 which is secured to annular boss 76 formed on a wall of switch box 25. From the underside of the switch 72 projects a spring biased switch button 77 which is adapted to be contacted and depressed by the trigger 64.

When the engine 10 is started up, oil under pressure is directed by the torque transmitting action of the ring gear (not shown) through channel 57 in nose casing 13 into the area where pressure switch 15 and magnesyn transmitter 14 are attached to the nose casing. As indicated above, the oil under pressure flows through hole 53 in the wall of cylinder 27, about annular groove 54 in sleeve 38 and through holes 55 into cylindrical bore 28. As the engine power output is increased piston head 41 is moved along the bore 28 against the force of light spring 49. The movement of piston head 41 causes the longitudinal displacement of piston rod 42 and simultaneously moves the carriage 62 and its associated trigger 64 to the right, as seen in the drawing (Figure 2). Were the trigger 64 fixedly maintained in carriage 62 movement of the carriage 62, which is induced by the transposition of the piston head 41, to the point where light spring 49 is fully compressed upon heavy spring 51 would cause the trigger 64 to depress switch button 77 and close the normally open contacts of switch 72. However, the pivotal mounting of trigger 64 causes it to be deflected backwardly when it comes into contact with the switch button 77 of micro-switch 72.

When the engine 10 reaches its normal power output the pressure of the oil is increased to a point where the piston head 41 begins to compress heavy spring 51. When the heavy spring 51 is compressed to a certain degree the deflected trigger 64 is carried past the switch button 77 without causing it to close the circuit of the micro-switch 72. Immediately upon reaching a position on the right side of switch button 77 the trigger 64 is driven into its erect position by the expansive action of spring 65 working against its base. This position of the trigger 64 in switch box 25 in relationship to switch button 77 of micro-switch 72 is called the armed position and can only be achieved when the engine is putting out at least 80 pounds of torque. Should greater torque be developed by the engine 10 there will be a tendency for the piston head 41 to be driven further to the right but the piston head 41 will impinge upon and be stopped by the top of spring guide 43.

The reason for the use of light spring 49 in conjunction with heavy spring 51 is apparent from the above description of the action of the oil pressure upon piston head 41. As pressure develops with the increased power output of the engine the piston head 41 is moved to the right, compressing light spring 49 upon the top of heavy spring 51. The compression of light spring 49 upon the top of heavy spring 51 may be achieved when torque pressure is in the neighborhood of 30 p. s. i. When spring 49 is fully compressed the movement of piston head 41 is retarded by the resistance of heavy spring 51. The retardation action of spring 51 is essential since it is not desired that the piston head 41 and rod 42 be permitted to carry trigger 64 into its armed position beyond switch button 77 until the pressure in cylinder bore 28 reaches 80 p. s. i. Since it would be extremely difficult to provide a spring having the compound characteristics of initial light resistance to the movement of piston head 41 and subsequent stiff resistance when a predetermined point is reached the two springs 49 and 51 are provided. It is not desirable that the pressure switch 15 be armed until the torque output of the engine reaches 80 p. s. i. because that is the minimum effective power output of the engine and the automatic propeller feathering system pressure switch need not be placed in the armed condition until the airplane is ready for flight.

When the torque pressure drops to 30 pounds or below due to loss of power in the engine the drop in pressure on piston head 41 permits it to be pushed sharply and quickly to the left by the force of heavy spring 51. The initial impetus is given to carriage 62 and its associated trigger 64 by the heavy spring 51 and a quick response to a drop in torque pressure is thus achieved. As the trigger 64 strikes the switch button 77 it depresses it, closing the normally open contacts of micro-switch 72 and permitting current to flow to feathering switch 16 in a manner which will be described in greater detail below. Spring 51 exhausts its travel path at this moment and light spring 49 takes over to move the piston head 41 to the limit of its travel. Since the power of light spring 49 is much less than that of heavy spring 51 the period of time in which the trigger 64 remains in contact with and depresses the switch button 77 is prolonged to assure that the normally open contacts of micro-switch 72 will be closed. The declination of trigger 64 to the right as it depresses switch button 77 is prevented by the fact that the stop 69 on trigger 64 comes into contact with stop seat 70 on the top of carriage 62. When the torque pressure drops to about 20 p. s. i. the trigger 64 is removed from contact with switch button 77 and the spring 49 finally brings the piston head 41 to rest upon stop 39 as the engine ceases to deliver power.

Since it is not desirable that the automatic propeller feathering system be activated at the very moment engine power falls off, since there may be a momentary loss of power when the engine misses, the size of the piston head 41 in relationship to cylinder bore 28 and the force of springs 49 and 51 is calculated to provide a time lag of 1.5 seconds before the trigger 64 will be brought into position to depress switch button 77 and close the contacts of micro-switch 72. This time lag is achieved by the control of piston and cylinder dimension since the hole 55 through which the oil must be forced out is of constant dimension. Thus, momentary power loss will not cause the propeller to be automatically feathered and render a properly functioning engine as ineffective as a truly malfunctioning one.

There is associated with the pressure switch 15 a propeller feathering switch 16 (Figure 3) which is adapted to be mounted in a hole 79 formed in the instrument panel 80 of the aircraft. The feathering switch 16 comprises a cylindrical metal housing 81 which has positioned in one end thereof and projecting therefrom a cylindrical, threaded, hollow, mounting boss or means 82 adapted to be threadedly engaged by a nut 83 which draws the top 84 of housing 81 against the inner side of instrument panel 80 and securely mounts switch 16 therein through the medium of hole 79. Secured in the lower end of housing 81 is a cylindrical block 85 of plastic or similar dielectric material. Block 85 is adapted to serve as a mounting medium for various contacts contained in the switch 16 as will be described below.

Running through the length of both switch housing 81 and plastic block 85 is an elongate, cylindrical, actuating rod or element 86 which has one end projecting from the instrument panel side of the switch and the other end protruding from the base of plastic block 85. Actuating rod 86 passes through a hole 87 formed in the top of mounting boss 82. In this region the diameter of the actuating rod 86 is substantially increased to form a hollow cylindrical bulb-holding member 88 having a threaded exterior 89. Mounted on member 88 by virtue of threaded exterior 89 is a translucent knob 90 formed of plastic or other material. The interior of member 88 has a threaded bore 91 adapted to receive an incandescent lamp 93 which is lighted when a propeller feathering operation takes place and whose light is diffused through the translucent knob 90. A smaller bore 94 lies immediately below threaded bore 91 and serves as the terminus of a lead 95 which runs through a hole 96 in actuating rod 86 and carries power to the incandescent lamp 93. The terminal end of lead 95 is securely affixed, as by means of solder, to a washer 97 composed of dielectric material which is spring biased against the base of lamp 93 by means of a spring 98, thus bringing the terminal end of lead 95 into contact with the base of lamp 93 and causing current to flow into lamp 93 when the switch 16 is actuated. Lamp 93 is grounded out through the sliding contact of cylindrical member 88 with mounting means or boss 82 into instrument panel 80.

A chamber or receptacle 100 is formed within the mounting boss 82 and has mounted at one end thereof a washer 101 which rests against the base 99 of member 88 and lies about actuating rod 86. A spring 102 is housed in chamber 100 and is adapted to bias the washer 101 into contact with the base 99 of member 88. The other end of spring 102 is seated on another washer 103 which, in turn, rests upon a spacer disc 104. Therefore, when the translucent knob 90 is pushed in to voluntarily actuate feathering switch 16 the base 99 of member 88 forces the washer 101 against the spring 102 and when the feathering action is completed the expansion of spring 102 will cause washer 101 to drive against base 99 of member 88 and return knob 90 to the neutral position.

Passing through the center of spacer disc 104 and mounted securely about the periphery of actuating rod 86 is a sleeve 105 which has one end positioned against the underside of washer 103 and its other end in contact with one end of a solenoid core 106 which is carried upon actuating rod 86. When the translucent knob 90 of switch 16 is pulled out to unfeather the propeller, which has previously been feathered, sleeve 105 is carried upon actuating rod 86 through spacer disc 104. The movement of sleeve 105 upon rod 86 causes the dislodgment of washer 103 which, in turn, compresses spring 102. When knob 90 is released it is returned to the neutral position by the expansive action of spring 102.

Mounted within switch housing 81 and positioned therein by means of a spacer ring 107 and a perforate spacer disc 108 which cooperate with spacer disc 104 is a field coil or winding 109 which is adapted to be energized, as will be described below, to draw in solenoid core 106 and to hold it in, thus initiating the automatic feathering of the propeller with which it is associated. A metallic, perforate, circular supporting block 111 is located at the base of the coil 109 and has a dielectric washer 112 seated upon it which is adapted to prevent the solenoid core 106 from shorting out through the supporting block 111 when a metallic spacer sleeve 113 carried upon the actuating rod 86 comes in contact with supporting block 111.

Positioned on rod 86 below spacer sleeve 113 is a dielectric sleeve 114 which is retained upon actuating rod 86 by a nut 115 threadedly engaged upon the end of rod 86. Slideably mounted about dielectric sleeve 114 is a contact disc 116 which is isolated from contact with spacer sleeve 113 by means of a dielectric washer. Another dielectric washer is placed upon the other side of contact disc 116 to isolate it and provide a seat for a spring 119 which is positioned about dielectric sleeve 114. Dielectric sleeve 114 serves to isolate contact disc 116 from metallic actuating rod 86 and spring 119 maintains contact disc 116 biased against the lower end of spacer sleeve 113. Electrical contacts 121 are adapted to be retained in normal contact with conductive, contact disc 116 when the feathering switch 16 is in the neutral position. When knob 90 is pushed in conductive disc 116 is carried away from contacts 121 because of the movement of actuating rod 86 and spacer sleeve 113 against which dielectric washer rests, compressing spring 119 whose lower end is seated on a dielectric washer which, in turn, rests upon a conductive, contact disc 123 fixed securely in dielectric sleeve 114. Conductive disc 123 is adapted to contact lower contact points 124 which are secured in plastic block 85 through the medium of screws 125 or similar fasteners when the knob 90 is voluntarily pushed inwards or the pressure switch 15 is activated, thus causing the propeller to be automatically feathered. Contact disc 123 is adapted to touch upper contacts 126 which are secured within plastic block 85 by means of screws 127 when knob 90 is pulled outwardly to unfeather the propeller. When this unfeathering action takes place contact disc 116 remains in contact with contact points 121 but the dielectric sleeve 114 is carried longitudinally through the hole in the center of disc 116 and spring 119 is compressed on disc 116 by the longitudinal movement of disc 123. There is thus achieved a feathering switch 16 which is adapted to feather the propeller both voluntarily and automatically and also unfeather a feathered propeller voluntarily. Further, there is provided in the switch a light which will give an indication to the pilot that a propeller, and which one, is being automatically feathered.

The circuit which is embodied in feathering switch 16 and utilized with pressure switch 15 in conjunction with a hydraulically actuated propeller is shown in Figure 5. The circuit is shown as embodying two propeller feathering switches 16 and 16a and two pressure switches 15 and 15a and is adapted to be utilized in conjunction with a twin-engined airplane having engines with built in torque indicating means. It is, of course, not intended to limit the application of the invention to twin-engined aircraft since it is also applicable to four and six engined aircraft with equal facility.

A power source 130 such as a battery housed within the aircraft is grounded, as at 131, and is connected by lead 133 to an on-off or master switch 132 which is mounted on instrument panel 80. When the on-off switch 132 is thrown power flows through a lead 134 to the normally closed side 135 of a blocking relay 136. Relay 136 is grounded as at 137 and the power flows through the closed side 135 of the relay 136, whose function in the circuit will be described in greater detail below, through lead 138 to throttle switches 23 and 23a which are normally open. Power also flows from lead 138 into on-off lamp 139 which is grounded at 140 and which is lighted by the throwing on of on-off switch 132. Thus the pilot always knows when the automatic propeller feathering system is on.

Throttle switches 23 are associated with each of the throttles 22 and when the throttles are advanced to 75% of the throttle travel the normally open throttle switches 23 are closed, permitting power to flow through lead 141 to the power pole of the normally open micro-switches 72 which are housed in switch box 25 of pressure switches 15 and 15a.

Should an engine power loss occur with the throttles advanced to 75% of their travel and the on-off switch 132 closed the falling off of torque pressure to or below 30 pounds would close the torque actuated pressure switch 15 in the same manner described above. The normally open contacts of micro-switch 15 would be closed and power would flow to the feathering switch 16 or 16a. For purposes of clarity in illustration let us presume that the engine associated with feathering switch 16 has failed, that the throttles 22 are advanced to 75% of their travel, closing throttle switches 23, and permitting current to flow to pressure switch 15. The momentary lag in pressure switch 15 adapted to prevent the undesired automatic feathering of a propeller associated with a momentarily malfunctioning engine has taken place and the normally open contacts of micro-switch 72 are closed by the action of trigger 64 upon switch button 77.

Instead of flowing directly through lead 142 to the feathering switch 16 with which it is associated the current from pressure switch 15 flows into the power contact 143a in feathering switch 16a which is in contact with conductive disc 116a since the switch 16a is in the neutral position and when in neutral or inactive position the conductive disc 116a is always in constant contact with power pole 143a. Power is passed through switch 16a before it reaches switch 16 to prevent feathering switch 16 from being activated should the feathering switch 16a be in its on position. As indicated above, should the feathering switch 16a be in its actuated or on position conductive disc 116a would be moved out of contact with power pole 143a and prevent current from flowing into pole 144a which is in contact with the other side of the disc 116a. Therefore, the automatic feathering of a propeller when the other propeller has been feathered is rendered impossible, since the actuation of the switch which is feathering the one propeller automatically inactivates and isolates from power the switch which would otherwise automatically feather the additional propeller. Thus, the possibility of the simultaneous automatic feathering of two propellers is avoided and it is left to the pilot to decide whether he wishes voluntarily to feather the additional propeller.

Since the propeller feathering switch 16a is not in feathering position power is able to flow from conductive disc 116a into contact 144a and thence through lead 145 into solenoid field coil 109 of feathering switch 16. Solenoid core 106 is drawn in immediately and both conductive discs 116 and 123 are carried downwardly (as seen in the circuit) upon actuating rod 85. Conductive disc 116, whose function in cutting off power from feathering switch 16a is the same as that of conductive disc 116a, is immediately moved out of contact with power pole 143, thus preventing power from flowing through disc 116 into pole 144 through lead 145a into switch 16a and causing it to be actuated.

Conductive disc 123 is drawn downwardly simultaneously with disc 116 and into contact with contact elements adapted to feather the propeller. Power from a power source 130a immediately flows into conductive disc 123 through power contact 146. Power flowing through disc 123 runs into lamp contact 147 and lead 149 lighting lamp 93 of switch 16 and indicating to the pilot that the feathering process is initiated and also giving him a chance to reject and halt the process by the simple expedient of pulling the switch 16 into its neutral inactive position. Lamp contact 147 also transmits power through lead 148 to a conventional relay-controlled motor driven feathering pump 150 which immediately starts to pump fluid to cause the feathering of the propeller blades. Power also flows from disc 123 into contact 151 which transmits power into a de-icer relay and prevents power from flowing into the heat anti-icing circuit associated with the propeller being feathered.

A blocking relay contact 152 is also contacted by conductive disc 123 and power thus flows through lead 154 into blocking relay 136 whose coil 153 is energized and breaks the contact on the normally closed side 135 of the relay. Power is thus prevented from flowing through lead 134 through closed side 135 of blocking relay 136 into throttle switches 23 and eventually actuating either of switches 16 or 16a when they have returned to neutral after accomplishing a propeller feathering operation. In this manner the entire automatic propeller feathering system is rendered inactive and can only be reactivated by throwing the on-off switch 132 off and then throwing it on again. Because of the throwing of relay 136 the light 139 which indicates that the system is active also goes out indicating to the pilot that the system is no longer effective.

Contact point 155 is also brought into contact with conductive disc 123 and has a resistance 156 associated therewith which is adapted to cut the voltage slightly before the power is fed into lead 157 and thence into field coil 109 of switch 16. Thus current is fed into coil 109 simultaneously with the throwing open of blocking relay 136 thus preventing the cutting off of current from power source 130 from terminating the feathering process before the propeller is feathered. Power flows through coil 109, through lead 158 into a pressure cut out switch 159 which is grounded at 160. When the blades of the propeller are fully feathered by the action of the feathering pump 150 the pump builds up pressure in pressure cut out switch 159 and breaks the circuit, thus cutting the flow of current through coil 109 of switch 16 and permitting the switch 16 to return to the neutral position. The release of the coil 109 upon solenoid core 106 also permits the return of the conductive disc 123 to a position where it is in contact with no contact points and also returns conductive disc 116 into contact with points 143 and 144. The feathering pump 150 is also inactivated by the breaking of the circuit and as hydraulic pressure falls off pressure cut out switch 159 is permitted to close and be ready for the reactivation of the system.

The propeller is now feathered, the feathering switch 16 is returned to the neutral position, the blocking relay 136 has been energized and thrown open, the system on light 139 is out and the on-off switch is still in the on position. Since the blocking relay 136 is held open after the feathering switch 16 is returned to neutral by current flowing from power source 130, through on-off switch 132 and through lead 134, the switch must be thrown into the off position to deenergize relay 136 and permit it to return to the normally closed position. Then the switch 132 can be returned to the on position and the current will flow through the closed side of blocking relay 136 and light the system on light 139 to indicate that the automatic propeller feathering system is ready to function.

The propeller, once feathered, can be voluntarily unfeathered by pulling out switch 16 and drawing conductive disc 123 upward into contact with power contact point 162. Power will then flow through disc 123 reenergizing de-icer relay by means of contact 163. Contact 164 will throw the solenoid valve 161 which controls the flow of hydraulic fluid and shifts the blade from the feathered position and contact 165 will start the feathering pump 150 to provide power to unfeather the propeller. When the propeller is unfeathered the pilot merely releases the switch and it will return to neutral thus cutting off the conductive disc 123 from power.

Also provided in the circuit is a test switch 166 which is adapted to ascertain whether pressure switch 15 is functioning properly. Test switch 166 has two poles, right hand pole 167 which is associated with a lead 169 to pressure switch 15 and left hand pole 168 having a lead 170 extending to pressure switch 15a. Either of the poles of the switch can be closed selectively to ascertain whether the pressure switch associated with that pole is functioning properly. Both leads 169 and 170 by-pass blocking relay 136 and throttle switches 23 and 23a and thus permit current to flow to the pressure switches 15 and 15a without passing through the throttle switches or the relay. To test either switch 15 or 15a the engine is brought up to 75% of power, the test switch is thrown to the desired pole and the throttle is then retarded. Such retardation of the throttle opens the throttle switches and would ordinarily cut the current flowing into the pressure switches but since, when the test switch is on, current by-passes the throttle switches, the pressure switches still receive current, the drop in power output of the engine causes the pressure switches to initiate the feathering of the propeller associated with the pressure switch that is being tested and draw in the feathering switch. When the feathering button begins to draw in the individual testing merely pulls it out and returns the feathering switch to neutral since the drawing in of the button indicates that the pressure switch associated with the activated feathering switch is functioning properly. The test switch is also simultaneously released.

There is thus provided an automatic propeller feathering system adapted to be utilized in conjunction with an engine having torque indication means embodied therein and a hydraulically actuated propeller. The system provides means adapted to prevent the simultaneous feathering of the propeller and further means adapted to inactivate the entire system when a propeller has been feathered.

There is shown in the drawings (Figure 6) a circuit which is adapted to be utilized in conjunction with the propeller feathering system as applied to an engine having embodied therein torque indicating means and equipped with an electrically actuated propeller. This system does not include the feathering switch 16 which is incorporated in the hydraulically actuated propeller feathering system since there is incorporated in the control circuit for the electrically actuated propellers feathering relay means adapted to perform the function of the feathering switch.

The conventional propeller pitch control circuit of an electrically actuated propeller incorporates a pitch control selector switch 182 which has a number of positions adapted to be selected to set the propeller at different pitch angles. However, when the conventional system is utilized in conjunction with the automatic propeller feathering system selector switch 182 is thrown into and retained in the automatic position as shown in Figure 6. Since the circuit as shown is adapted to be utilized in conjunction with a twin-engined aircraft there are provided two propeller pitch selector switches 182 and 182a. For purposes of clarity and to facilitate a description of the operation of the system, the operation of that part of the system associated with pitch selector switch 182 will be described.

When it is desired that the automatic propeller feathering system be energized both propeller selector switches are placed in automatic, as shown. Power is then enabled to flow from power source 183, which is grounded at 184, into a lead 185, through contact finger or leaf 186 of a feathering relay 187 through lead 188 into the contactor unit of a propeller synchronizer 189. Power also flows from power source 183a, which is grounded at 184a, into a lead 185a, through contact finger 186a of a blocking relay 187a through lead 188a into the contact unit of a propeller synchronizer 189. Thus, when the pitch selector switches 182 and 182a are in automatic power is supplied to the synchronizer 189 to permit the automatic synchronization of the propeller.

A double throw on-off switch 191 is placed in circuit with lead 188 through tap 192. At the on-off switch 191 the right hand pitch change switch 182 is connected to the left hand automatic propeller feathering circuit and the left hand pitch change switch 182a is connected to the right hand automatic propeller feathering circuit. The purpose of this switch-over will be described in greater detail below. When the left side 193a of the switch 191 is closed simultaneously with right side 193 power flows through switch 191 and lead 194a to the power side of a normally open micro-switch 72a incorporated in a pressure switch 15a which is the same as the torque pressure switch 15 shown in Figure 2 and described above. When the torque pressure switch 15a is armed by the advance of the throttles to 75% of their travel, a throttle switch 23a is simultaneously closed. However, since the contacts of the micro-switch 72a are open with the engine delivering power no current can flow through them. If the throttles 22 are retarded the contacts of the micro-switch 72a of torque pressure switch 15a will close but the opening of the contacts of throttle switch 23a will prevent the flow of current from automatically feathering the propeller.

Should engine power fall off to 30 pounds of torque with the throttles advanced the closing of the contacts of micro-switch 72a of pressure switch 15a will permit current to flow through lead 195a, into and through throttles switch 23a, through lead 196a and tap 197a into coil 198a of the feathering relay 187a. The coil 198a of relay 187a being thus energized the normally closed contact finger 186a will be opened and contact fingers 200a and 201a will be closed. The opening of contact finger 186a breaks the circuit through lead 188a with the contactor unit of synchronizer 189 and thus avoids the possibility of inadvertently unfeathering the feathered propeller because of the residual magnetism sometimes encountered in the bell rotor of such contactor units. The flow of current to the right hand side 193 of on-off switch 191 through lead 202a is also cut off with the opening of finger 186a. The cutting off of power from the right hand side of on-off switch 191 prevents the automatic feathering of the other propeller when the one propeller has been feathered or is in the process of being feathered. Therefore, despite the simultaneous loss of power on both engines only one propeller will be automatically feathered and it will rest with the pilot as to whether he wishes to feather the other propeller. The closing of the contacts of micro-switch 72a of pressure switch 15a also permits current to flow therefrom through lead 195a and lead 203a into warning light 204a which is grounded at 205a and to light it, thus indicating to the pilot that the feathering process has been initiated and, also, which propeller is being feathered. If the pilot wishes to reject the feathering of the propeller he need only throw master switch 191 into the off position. This will cut the current flowing from power source 183, through lead 185, through leaf 186 of relay 187, lead 188, tap 192 and left hand side 193a of on-off switch 191, into lead 181a, through leaf 200a of relay 187a, tap 197a and coil 198a. The relay 187a will thus be permitted to return to its normally close position cutting off the flow of current through leaf 201a of relay 187a and breaking the circuit between booster 212 and left pitch change motor 211a.

When relay 187a is moved from its normally closed position contact finger 201a also makes a circuit with the propeller voltage booster 212 through leads 206a, 207a, 208a, to leads 209a, to the left hand propeller pitch change motor 211a, starting it, and initiating the feathering of the blades. When the action of propeller pitch change motor 211a has completely feathered the propeller, the contacts of a limit switch (not shown) are opened by the fully feathered blade and the circuit with the booster 212 broken thus stopping the pitch change motor 211a.

The automatic propeller feathering system is rendered inactive, as described above, by the action of feathering relay 187a in cutting the flow of current to the side of on-off switch 191 connected with the unfeathered propeller. In order to reactivate the system and unfeather the feathered propeller on-off switch 191 should be thrown off and the propeller pitch selector switch must be moved out of automatic into increase R. P. M. position long enough to unfeather the propeller. This will cut the flow of current into the coil of the relay and return it to its normally closed position, placing the automatic feathering system in readiness to automatically feather its associated propeller once again, when master or on-off switch 191 is turned back on.

Incorporated in the automatic propeller feathering system is a normally open test switch 213 which is designed to by-pass the throttle switches to permit the functioning of the pressure switches and the feathering relays to be tested. For instance, when it is desired to test the pressure switch and feathering relay associated with the left hand propeller, the on-off switch 191 is thrown on. The engine is started up and the throttles advanced to 75% of their travel, thus arming pressure switch 15a. Test switch is then thrown to its left hand contact 214a and the throttles retarded to simulate engine failure. Normally, this throttle retardation and consequent opening of throttle switches would inactivate the circuit, but lead 215a by-passes throttle switch 23a and permits current to flow through lead 196a and tap 197a into energizing coil 198a of feathering relay 187a. The customary automatic feathering cycle will then take place if the pressure switch 15a and feathering relay 187a are in good working order. Light 204a will also go on to indicate the initiation of the feathering process. To stop the propeller from being fully feathered once the feathering has started, the test switch is released, the on-off switch is turned off and the automatic propeller feathering system is reset as described above.

There is thus provided an automatic propeller feathering system adapted to be utilized in conjunction with engines having built in torque transmitting means and electrically actuated variable pitch propellers. The system embodies pressure responsive means associated with feathering means adapted to feather a propeller automatically when activated by the pressure responsive means.

Since there are in operation at the present time many aircraft having engines which do not embody torque pressure transmitting means another embodiment of the automatic propeller feathering system has been developed for utilization in conjunction with such engines. Shown in Figure 7 of the drawings is an installation of one portion of such a system. The embodiment under discussion is adapted to be used in conjunction with hydraulically actuated propellers and it therefore utilizes a feathering switch essentially similar to feathering switch 16 described above. However, with the exception of the feathering switch and feathering circuit the same system can be utilized in conjunction with an electrically actuated propeller. The installation of the feathering circuit will then be similar to that shown in Figure 6 of the drawings.

Aircraft engines are supported upon their mounts through the intermediary of flexible mounting which tend to isolate the vibration of the engines from the structure of the aircraft. Such mounting of engines is well known to those skilled in the art and it is not deemed necessary to show it in the drawings. When the engine is not turning out power it is in a state of rest upon the mounts but when the engine is putting out power it tends to shift on its axis upon the mounts in a direction opposite to the direction in which the propeller is turning. This axial movement of the engine upon its mounts is caused by the torque the engine is delivering to the propeller and when the power output of the engine drops off the engine shifts back into its original position on the mounts. Therefore, if a fixed point is established in the engine nacelle in relationship to the engine itself the distance between that fixed point will be greater when the engine is delivering torque than it is when the engine has failed or is inactive.

It is this principle of the axial displacement of the engine on its mounts when developing power that is utilized in the embodiment of the automatic propeller feathering system under discussion. Shown in the drawings (Figure 7) is a typical installation which embodies a cam plate 216 pivotally mounted upon the throttle rod 217 and connected to the throttle balance arm 218 of an engine carburetor 219. Mounted upon a portion of the engine mounting 220 as by means of clamps 221 is a switch 222 having normally open contacts adapted to be closed by the depression of a switch button 223 which protrudes from one side of the switch. Pivotally mounted in a bracket 224 secured to the side of switch 222 from which button 223 protrudes is a lever arm 225 which has a roller or wheel 226 rotatably mounted on one end thereof and its other end connected to an arm 227 which is adapted to depress the switch button 223 when said roller 226 depresses arm 225 in a manner to be described below.

Cam plate 216 comprises a main, flat, frontal or contacting area 228, which is adapted to impinge upon roller 226, as will be described below, having a mounting lobe 229 in the same plane adapted to be secured to the end of throttle shaft or rod 217 as by means of bolt 230 and an inwardly offset or instruck mounting lobe 231 which is secured to throttle balance arm 218 by means of bolt and nut combination 232. That portion of the cam plate 216 which lies on the side of the plate diametrically opposite mounting lobes 29 and 31 is cammed in to form a depressed portion 233.

When the throttle is retarded and the engine inoperative the throttle balance arm 218 is in the retracted position and cam plate 216 is rotated upon throttle rod 217 in such a manner that the depressed or cammed-in portion 233 of cam or throttle plate 216 lies opposite the roller 226 of switch 222. The engine, being inoperative because of the retardation of the throttle, is suspended in its power-off condition on the mounts, just as it would be if a power failure had been encountered. However, the cammed portion 233 of throttle plate 216 does not impinge on the switch as can be seen in Figures 7 and 8 of the drawings.

As the engine is started up and progressively more power put out by the engine because of the advance of the throttle, the throttle plate 216 is rotated by throttle rod 217 into a position where its flat, contact area 228 lies opposite the roller 226 of switch 222. However, as shown in Figure 9, the torque output of the engine shifts it and the carburetor with which it is associated axially upon its mountings away from the switch 222. When the throttle is retarded, causing the torque output to drop and the engine to settle back on its mounts the throttle plate 216 once again moves toward switch roller 226, but it cannot contact it because of the cammed portion 233 is presented to the switch roller 226 due to the rotation of cam 216 concomitantly with the rotation of throttle rod 217 as caused by the retardation of the throttle.

Should the engine fail with the throttle advanced, as it must be for the engine to deliver power, the engine will cease to develop torque and will settle back on its mounts just as it does when the throttle is retarded. However, since the throttle is still advanced and the throttle plate 216 has consequently not been rotated to present its cammed portion 233 to roller 226, the flat contact surface 228 of throttle plate 216 will impinge upon the roller 226, depressing arms 225 and 227 and pushing in switch button 223. The normally open contacts (not shown) of the micro-switch are closed and power is permitted to flow through leads 234 into feathering switch 16, actuating it and, through a circuit identical with that shown in Figure 5, feathering the propeller.

The throttle plate 216 and switch combination 222 is thus utilized to detect the falling off of power in the engine in place of the pressure switch included in the previously described embodiments. The combination is as responsive to the falling off of the torque output of the engine as evidenced by the shifting of the engine on its mounts as the pressure switch utilized in the above described embodiments is responsive to the falling off of the torque output of the engine as evidenced by the drop in oil pressure at the pressure switch. Therefore, the only distinction between the above described embodiments and that under discussion lies in the substitution of the switch, cam plate combination for the pressure switch. The change merely involves the substitution of one torque responsive device for another to meet engine design changes.

One of the prime considerations in the design of the automatic propeller feathering system is the avoidance of the possibility that a momentary power failure, such as back-fire, might initiate the automatic feathering process despite the fact that the engine continued to put out power. The above discussed embodiments included in the pressure switch means adapted to prevent the actuation of the pressure switch by a momentary lapse in power output. The present embodiment also includes a time lag assembly designed to prevent a similar occurrence.

Embodied in the protuberance 235 (Figure 11) on switch 22, which surrounds switch button 223 is the time lag mechanism which prevents a momentary cessation in engine power from actuating the automatic feathering cycle. Switch button 223 protrudes from protuberance 335 and has an integral annular collar 336 formed on its periphery adapted to prevent it from being driven out of the protuberance by the expansive force of spring 237 which biases it into its extended and inactive position. The interior of the protuberance forms a chamber which is closed at its base by a circular resilient diaphragm 238 having retained in the center thereof a cylindrical boss 239 having its upper portion providing a seat for the lower end of spring 237 and its lower portion adapted to contact plunger 240 of micro-switch 241 to make the automatic feathering circuit.

Formed in the side of protuberance 235 is a hole 242 which is of such dimensions that a metered quantity of air is permitted to enter the interior of the protuberance.

Should the engine, when putting out power, cease to develop power momentarily due to a miss or back-fire the engine would swing back on its mounts into the no-torque or power-off position, the contact area 228 of throttle plate 216 would depress lever arm 225 and roller 226 causing arm 227 to push in switch button 223. Switch button 223 would compress spring 237 and would tend to depress diaphragm 238. However, the diaphragm 238 would resist the tendency of the spring 237 to drive it downwardly because the quantity of air inside the chamber would have to be increased. The size of the hole 242 is so calibrated that a minimal amount of air can be drawn into the chamber inside the protuberance in a certain period of time. Since a sufficient amount of air cannot be drawn into chamber through hole 242 to permit the deflection of diaphragm 238 during the short time interval of a momentary power lapse the diaphragm 238 will resist the movement of spring 237 and prevent the lower side of cylindrical boss 239 from contacting microswitch plunger 240 and making the automatic feathering circuit. The time delay caused by the construction shown above can be controlled by increasing or diminishing the size of intake hole 242. When the switch button 237 remains depressed for a prolonged time enough air is sucked into the chamber to permit the diaphragm to drive the lower end of cylindrical boss 239 into contact with micro-switch plunger 240 and make the automatic feathering circuit.

In this manner, all three embodiments of the invention are provided with time lag means which consist in a cylinder or chamber having a hole therein and a plunger or diaphragm whose action or movement is controlled by the passage of fluid through the hole.

Therefore, an automatic propeller feathering system is provided which can be effectively utilized in its various embodiments in conjunction with a wide variety of engine installations, which is readily and easily installed, can be cheaply manufactured and operates in a highly efficient and satisfactory manner.

It is, of course, obvious that the above described embodiments of the present invention have been shown and described for the purpose of exemplifying and illustrating the manner of operation and type of construction to be utilized in the application of the invention to various engine installations. It is not intended that the invention be limited to the specific details of the actual embodiments since it should be clear to those skilled in the art that changes might be made in the arrangement and details of the various embodiments which would still fall within the scope of the appended claims.

I claim:

1. A system operable on engine failure to automatically feather a variable pitch propeller having an operative connection with an aircraft engine, said engine having embodied therein torque pressure transmitting means comprising, in combination, torque pressure switch means mounted upon the housing of said engine to be actuated by torque pressure in said torque pressure transmitting means, said torque pressure switch means embodying movable pressure operated means responsive to fluctuations in torque pressure, time lag means, and electric switch means operable by said pressure operated means when said pressure operated means moves beyond a certain limit on the occurrence of engine failure, said time lag means being operative to prevent said pressure operated means actuating said electric switch means on the occurrence of a momentary drop in torque pressure, propeller feathering switch means wired in circuit with said torque pressure switch means and a propeller feathering circuit electrically connected to the feathering switch means to be energized by said feathering switch means on activation of the latter by said torque pressure switch means.

2. A system operable on engine failure to automatically feather a variable pitch propeller having an operative connection with an aircraft engine, said engine having embodied therein torque pressure transmitting means comprising, in combination, torque pressure switch means mounted upon the housing of said engine, said torque pressure switch means embodying movable pressure operated means responsive to fluctuations in torque pressure, time lag means, and electric switch means operable by said pressure operated means when said pressure operated means moves beyond a certain limit on the occurrence of engine failure, said time lag means being operative to prevent said pressure operated means actuating said electric switch means on the occurrence of a momentary power loss, propeller feathering switch means wired in circuit with said torque pressure switch means having indicating means embodied therein for signalling the initiation of the automatic propeller feathering cycle and a propeller feathering circuit electrically connected to the feathering switch means to be energized by said feathering switch means on activation of the latter by said torque pressure switch means.

3. A system operable on engine failure to automatically feather a variable pitch propeller having an operative connection with an aircraft engine comprising, in combination, torque responsive means operatively connected with the engine, and actuable on the occurrence of engine failure, said torque responsive means incorporating time lag means for preventing the actuation of said torque responsive means on the occurrence of a momentary power loss, said time lag means comprising a fixed dimensional orifice, and a movable element whose movement is controlled by the passage of fluid through said orifice, feathering switch means actuable by said torque responsive means on engine failure in circuit therewith and a propeller feathering circuit electrically connected to the feathering switch means to be energized by said feathering switch means on actuation of the latter by said torque responsive means.

4. A propeller feathering system operable on engine failure to automatically feather a variable pitch propeller which has an operative connection with an aircraft engine comprising, in combination, torque responsive means actuable on the occurrence of an engine failure, said torque responsive means comprising a cam plate rotatably mounted upon said engine, an electric switch means mounted adjacent said engine operable by said cam plate should said engine fail, feathering switch means wired in circuit with said torque responsive means to be activated thereby and a propeller feathering circuit electrically connected to the feathering switch means to be energized by said feathering switch means on activation of the latter by the torque responsive means.

5. A propeller feathering system operable on engine failure to automatically feather a variable pitch propeller operatively connected to an aircraft engine comprising, in combination, torque responsive means actuable on occurrence of an engine failure, said torque responsive means comprising a cam plate rotatably mounted upon said engine, electric switch means mounted adjacent said engine operable by said cam plate should said engine fail, feathering switch means wired in circuit with said torque responsive means to be activated thereby, indicating means incorporated in said feathering switch means for signalling the initiation of the automatic feathering process and a propeller feathering circuit electrically connected to the feathering switch means to be energized by said feathering switch means on activation of the latter by the torque responsive means.

6. A propeller feathering system operable on engine failure to automatically feather a variable pitch propeller operatively connected to an aircraft engine comprising, in combination, torque responsive means actuable on the occurrence of an engine failure, said torque responsive means comprising a cam plate rotatably mounted on said engine and electric switch means mounted adjacent said engine, time lag means incorporated in said electric switch means to prevent actuation of said electric switch means on the occurrence of a momentary engine power loss, feathering switch means wired in circuit with said torque responsive means to be activated thereby and a propeller feathering circuit electrically connected to the feathering switch means to be energized by said feathering switch means on actuation of the latter by the torque responsive means.

7. A propeller feathering system operable on engine failure to automatically feather a variable pitch propeller operatively connected to an aircraft engine comprising, in combination, torque responsive means actuable on the occurrence of an engine failure, said torque responsive means comprising a cam plate rotatably mounted on said engine and electric switch means mounted adjacent said engine, time lag means incorporated in said electric switch means to prevent actuation of the electric switch means in the event of a momentary engine power loss, said time lag means comprising a flexible diaphragm whose movement is regulated by an unvarying orifice, feathering switch means wired in circuit with said torque responsive means to be activated thereby and a propeller feathering circuit electrically connected to the feathering switch means to be energized by said feathering switch means on activation of the latter by the torque responsive means.

8. An automatic feathering system for an aircraft engine having a feathering variable pitch propeller, comprising, in combination, a propeller feathering circuit, feathering switch means operatively connected to said propeller feathering circuit manually operable to energize said propeller feathering circuit for normal propeller feathering operation, and torque responsive means operable on failure of the aircraft engine to deliver torque connected in circuit with said feathering switch means for actuation thereof to energize the propeller feathering circuit for automatic propeller feathering operation.

9. An automatic feathering system for an aircraft engine having a feathering variable pitch propeller, comprising, in combination, a propeller feathering circuit, feathering switch means operatively connected to said propeller feathering circuit manually operable to energize said propeller feathering circuit for normal propeller feathering operation, torque responsive means operable on failure of the aircraft engine to deliver torque connected in circuit with said feathering switch means for actuation thereof to energize the propeller feathering circuit for automatic propeller feathering operation, indicating means connected to said feathering switch means for signalling the initiation of the automatic propeller feathering operation.

10. A propeller feathering system for automatically feathering a variable pitch propeller which is driven by an aircraft engine, comprising, in combination, a propeller feathering circuit, feathering switch means wired in circuit with said propeller feathering circuit manually operable to energize said propeller feathering circuit for normal propeller feathering operation, torque responsive means operable on failure of the aircraft engine to deliver torque connected in circuit with said feathering switch means for actuation thereof to energize the propeller feathering circuit for automatic propeller feathering operation, and time lag means incorporated in said torque responsive means for preventing operation of said torque responsive means on the occurrence of momentary engine power failure.

11. A propeller feathering system for automatically feathering a variable pitch propeller which is driven by an aircraft engine, comprising, in combination, a propeller feathering circuit, feathering switch means wired in circuit with said propeller feathering circuit manually operable to energize said propeller feathering circuit for normal propeller feathering operation, torque responsive means operable on failure of the aircraft engine to deliver torque connected in circuit with said feathering switch means for actuation thereof to energize the propeller feathering circuit for automatic propeller feathering operation, indicating means connected to said feathering switch means for signalling the initiation of the automatic propeller feathering operation, and time lag means incorporated in said torque responsive means for preventing operation of said torque responsive means on the occurrence of momentary engine power failure.

12. An automatic feathering system for plural engine aircraft having feathering variable pitch propellers, comprising, in combination, a propeller feathering circuit for each propeller for independently feathering the propeller, a feathering switch operatively connected to each propeller feathering circuit manually operable to energize its propeller feathering circuit for normal feathering of the propeller controlled by said circuit, a torque responsive means associated with each engine and each being operable on failure of its associated engine to deliver torque, and connections from each torque responsive means to its respective feathering switch for actuation of the latter to energize a propeller feathering circuit for initiating an automatic propeller feathering operation.

13. An automatic feathering system for plural engine aircraft having feathering variable pitch propellers, comprising, in combination, a propeller feathering circuit for each propeller for independently feathering the propeller, a feathering switch operatively connected to each propeller feathering circuit manually operable to energize its propeller feathering circuit for normal feathering of the propeller controlled by said circuit, a torque responsive means associated with each engine and each being operable on failure of its associated engine to deliver torque, connections from each torque responsive means to its respective feathering switch for actuation of the latter to energize a propeller feathering circuit for initiating an automatic propeller feathering operation, blocking relay means in circuit with said feathering switches adapted when open to prevent current flow to said feathering switches thereby inactivating the atuomatic feathering system.

14. An automatic feathering system for plural engine aircraft, each engine having a feathering variable pitch propeller, comprising, in combination, a propeller feathering circuit for each propeller for independent feathering thereof, a feathering switch electrically connected to each propeller feathering circuit manually operable to energize its propeller feathering circuit for normal feathering of the propeller controlled by said circuit, a torque responsive means connected with each engine operable on failure of its associated engine to deliver torque, connections from each torque responsive means to its respective feathering switch for actuation of the latter to energize a propeller feathering circuit for initiating an automatic propeller feathering operation, indicating means connected to each of said feathering switches for signalling the initiation of an automatic propeller feathering operation, blocking relay means in circuit with said feathering switches adapted when open to prevent current flow to said feathering switches thereby inactivating the automatic feathering system.

15. An automatic feathering system for plural engine aircraft, each engine having a feathering variable pitch propeller, comprising, in combination, a propeller feathering circuit for each propeller for independent feathering thereof, a feathering switch electrically connected to each propeller feathering circuit manually operable to energize its propeller feathering circuit for normal feathering of the propeller controlled by said circuit, a torque responsive means connected with each engine operable on failure of its associated engine to deliver torque, connections from each torque responsive means to its respective feathering switch for actuation of the latter to energize a propeller feathering circuit for initiating an automatic propeller feathering operation, time lag means incorporated in each of said torque responsive means for preventing operation of the torque responsive means on the occurrence of momentary engine failure, blocking relay means in circuit with said feathering switches adapted when open to prevent current flow to said feathering switches thereby inactivating the automatic feathering system.

16. An automatic feathering system for plural engine aircraft, each engine having a feathering variable pitch propeller, comprising, in combination, a propeller feathering circuit for each propeller for independent feathering thereof, a feathering switch electrically connected to each propeller feathering circuit manually operable to energize its propeller feathering circuit for normal feathering of the propeller controlled by said circuit, a torque responsive means connected with each engine operable on failure of its associated engine to deliver torque, connections from each torque responsive means to its respective feathering switch for actuation of the latter to energize a propeller feathering circuit for initiating an automatic propeller feathering operation, indicating means connected to each of said feathering switches for signalling the initiation of an automatic propeller feathering operation, time lag means incorporated in each of said torque responsive means for preventing operation of the torque responsive means on the occurrence of momentary engine failure, blocking relay means in circuit with said feathering switches adapted when open to prevent current flow to said feathering switches thereby inactivating the automatic feathering system.

17. An automatic safety propeller feathering system for plural engine aircraft comprising in combination with a normal propeller feathering system for each engine, a torque switch for each engine, range switches for arming said torque switches in the maximum power range of engine operation, means controlled by said torque switches for automatically initiating propeller feathering functioning of the propeller feathering system of a torque losing engine detected by one of said torque switches and means bypassed about said range switches for arbitrarily initiating said propeller feathering functioning and including a manually operable test switch circuit for each engine.

18. A system operable on engine failure to automatically feather a variable pitch propeller having an operative connection with said aircraft engine comprising, in combination, torque responsive means embodying movable fluid pressure operated means responsive to fluctuations in torque pressure, time lag means operatively associated with said fluid pressure operated means and electric switch means operable by said fluid pressure operated means when the latter moves beyond a certain limit on the occurrence of engine failure, said time lag means being operative to prevent said fluid pressure operated means actuating said electric switch means on the occurrence of a momentary power loss, propeller feathering switch means operable by said torque responsive means on engine failure, and a propeller feathering circuit electrically connected to the propeller feathering switch means to be energized thereby on activation of the feathering switch means by said torque responsive means.

19. A system operable on engine failure to automatically feather a variable pitch propeller having an operative connection with an aircraft engine, said engine having embodied therein torque pressure transmitting means comprising, in combination, torque pressure responsive switch means, which latter switch means embodies fluid pressure operated means responsive to fluctuations in torque pressure, time lag means and electric switch means operable by said fluid pressure operated means when the latter moves beyond a certain limit on the occurrence of engine failure, said time lag means being operative to prevent said fluid pressure operated means actuating said electric switch means on the occurrence of a momentary power loss, propeller feathering switch means wired in circuit with said torque pressure responsive switch means having indicating means embodied therein for signalling the initiation of the automatic propeller feathering cycle, and a propeller feathering circuit electrically connected to the feathering switch means to be energized by said feathering switch means on activation of the latter by said torque pressure responsive switch means.

20. An automatic feathering system for plural engine aircraft having feathering variable pitch propellers, comprising, in combination, a propeller feathering circuit for each propeller for independently feathering the propeller, a feathering switch operatively connected to each propeller feathering circuit for effecting energization thereof to feather the propeller control by said circuit, a torque responsive means associated with each engine and each being operable on failure of its associated engine to deliver torque, connections from each torque responsive means to its respective feathering switch for actuation of the latter to energize a propeller feathering circuit for initiating an automatic propeller feathering operation, and a blocking relay in circuit with said feathering switches for controlling all of the propeller feathering circuits adapted when open to prevent current flow to said feathering switches thereby inactivating the automatic feathering system.

21. An automatic feathering system for plural engine aircraft, each engine having a feathering variable pitch propeller, comprising in combination, a propeller feathering circuit for each propeller for independent feathering thereof, a feathering switch electrically connected to each propeller feathering circuit for effecting energization thereof to feather the propeller controlled by said circuit, a torque responsive means connected with each engine operable on failure of its associated engine to deliver torque, connections from each torque responsive means to its respective feathering switch for actuation of the latter to energize a propeller feathering circuit for initiating an automatic propeller feathering operation, time lag means incorporated in each of said torque responsive means for preventing operation of the torque responsive means on the occurrence of momentary engine failure, and a blocking relay in circuit with said feathering switches for controlling all of the propeller feathering circuits adapted when open to prevent current flow to said feathering switches thereby inactivating the automatic feathering system.

LAWRENCE J. BORDELON.

REFERENCES CITED

The following references are of record in the file of this patent:

UNITED STATES PATENTS

| Number | Name | Date |
| --- | --- | --- |
| 2,195,036 | Palmer | Mar. 26, 1940 |
| 2,322,303 | Martin | June 22, 1943 |
| 2,374,276 | French | Apr. 24, 1945 |
| 2,443,438 | Wilson | June 15, 1948 |
| 2,455,378 | McCoy | Dec. 7, 1948 |